United States Patent
Tsai et al.

(10) Patent No.: US 7,791,535 B2
(45) Date of Patent: *Sep. 7, 2010

(54) POSITIONING DEVICE AND METHOD FOR MEASURING THE DISTANCE BETWEEN MULTIPLE POSITIONING DEVICES

(75) Inventors: Shu-Jen Tsai, Taipei Hsien (TW); Tsung-Jen Chuang, Taipei Hsien (TW); Wen-Haw Tseng, Taipei Hsien (TW); Shih-Fang Wong, Taipei Hsien (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 46 days.

This patent is subject to a terminal disclaimer.

(21) Appl. No.: 12/189,119

(22) Filed: Aug. 8, 2008

(65) Prior Publication Data
US 2009/0135058 A1 May 28, 2009

(30) Foreign Application Priority Data
Nov. 23, 2007 (CN) .......................... 2007 1 0202654

(51) Int. Cl.
*G01S 19/38* (2010.01)
*G01S 3/02* (2010.01)
(52) U.S. Cl. .................................. 342/357.21; 342/458

(58) Field of Classification Search ............ 342/357.06, 342/357.08, 357.12, 458; 455/456.1, 456.6; 701/207, 213
See application file for complete search history.

(56) References Cited

U.S. PATENT DOCUMENTS

| | | | |
|---|---|---|---|
| 6,408,186 B1 * | 6/2002 | Park et al. | 455/456.1 |
| 7,277,050 B2 | 10/2007 | Ikeda | |
| 2004/0212530 A1 * | 10/2004 | Strickland et al. | 342/357.04 |
| 2004/0260506 A1 * | 12/2004 | Jones et al. | 702/150 |
| 2008/0304361 A1 * | 12/2008 | Peng et al. | 367/127 |
| 2009/0096666 A1 * | 4/2009 | Ikeda | 342/357.09 |
| 2009/0213003 A1 * | 8/2009 | Tsai et al. | 342/357.08 |
| 2009/0267830 A1 * | 10/2009 | Tsai et al. | 342/357.08 |

* cited by examiner

*Primary Examiner*—Dao L Phan
(74) *Attorney, Agent, or Firm*—Frank R. Niranjan

(57) ABSTRACT

A positioning device includes an antenna, a receiving module, a processing module and an output module. The receiving module receives positioning signals transmitted by positioning satellites and a position signal of another positioning device using the antenna. The processing module determines a position of the positioning device according to the positioning signals, and calculates a distance between the positioning device and another positioning device according to the position signal of the position device and the position signal of the other positioning device. The output module outputs the distance. A method for measuring the distance between the positioning devices is also provided.

11 Claims, 4 Drawing Sheets

POSITIONING DEVICE AND METHOD FOR MEASURING THE DISTANCE BETWEEN MULTIPLE POSITIONING DEVICES

BACKGROUND

1. Field of the Invention

Embodiments of the present disclosure generally relate to a positioning device and a method for measuring distance between multiple positioning devices.

2. Description of Related Art

Positioning devices are widely used in electronic products, such as mobile phones and personal digital assistant (PDA).

Commonly, a positioning device includes an antenna, a receiving module, a processing module, and a displaying module. Using the antenna, the receiving module receives positioning signals transmitted from positioning satellites. The processing module determines a position of the positioning device using the positioning signals. The displaying module displays the position of the positioning device on an electronic map. Therefore, a user of the positioning device can know his position.

However, the user of the positioning device not only desires to know his own position, but also desires to know the distance between him and other positioning device users.

Therefore, a positioning device and a method for measuring distance between multiple positioning devices are needed to address the aforementioned deficiencies and inadequacies.

SUMMARY

Accordingly, a positioning device is provided for measuring distance between multiple positioning devices. Each positioning device includes an antenna, a receiving module, a processing module, and an output module. The receiving module, using the antenna, receives positioning signals transmitted by positioning satellites and a position signal of another positioning device. The processing module determines a position of the positioning device using the positioning signals and calculating a distance between the positioning device and another positioning device. The output module outputs the distance. A method for measuring the distance between the positioning devices is also disclosed.

Other advantages and novel features of the present disclosure will become more apparent from the following detailed description of the embodiment when taken in conjunction with the accompanying drawings, in which:

DETAILED DESCRIPTION OF THE EXEMPLARY EMBODIMENTS

Figure 1:
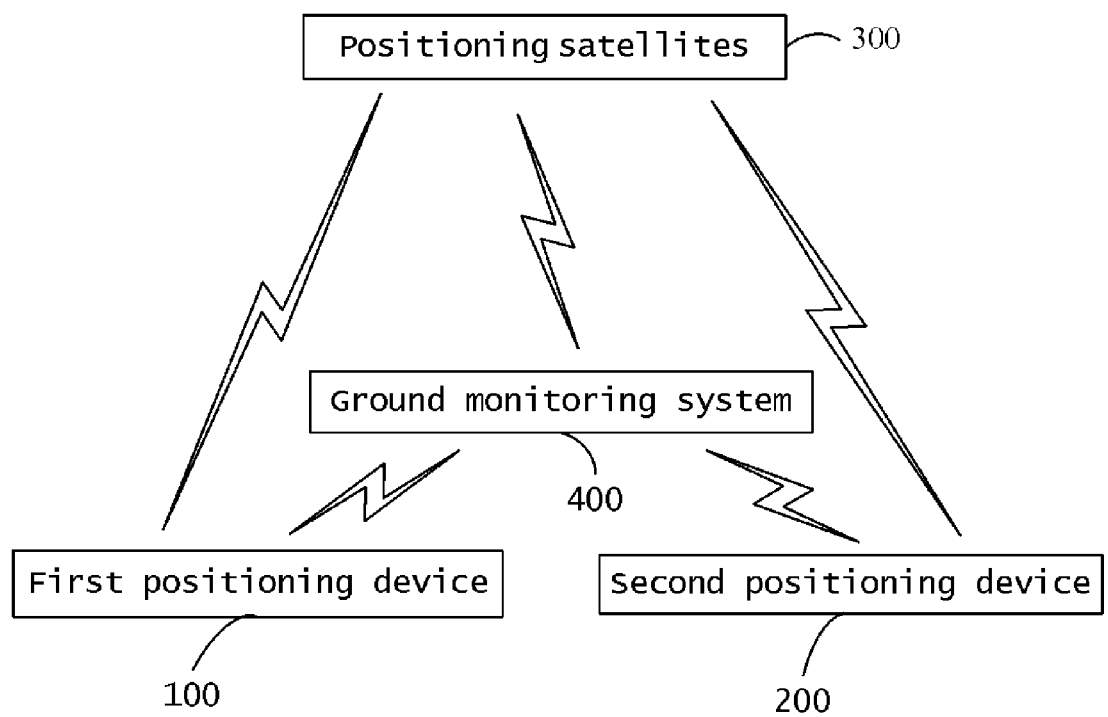
FIG. 1 is a schematic block diagram showing a communication system in accordance with an exemplary embodiment.

Referring to FIG. 1, an overall communication system 99 includes, for example, a first positioning device 100, a second positioning device 200, positioning satellites 300 for transmitting positioning signals to the first positioning device 100 and the second positioning device 200, and a ground monitoring system 400. The first positioning device 100 and the second positioning device 200 may be a mobile phone or a personal digital assistant (PDA), either or both having a global positioning system (GPS).

Figure 2:
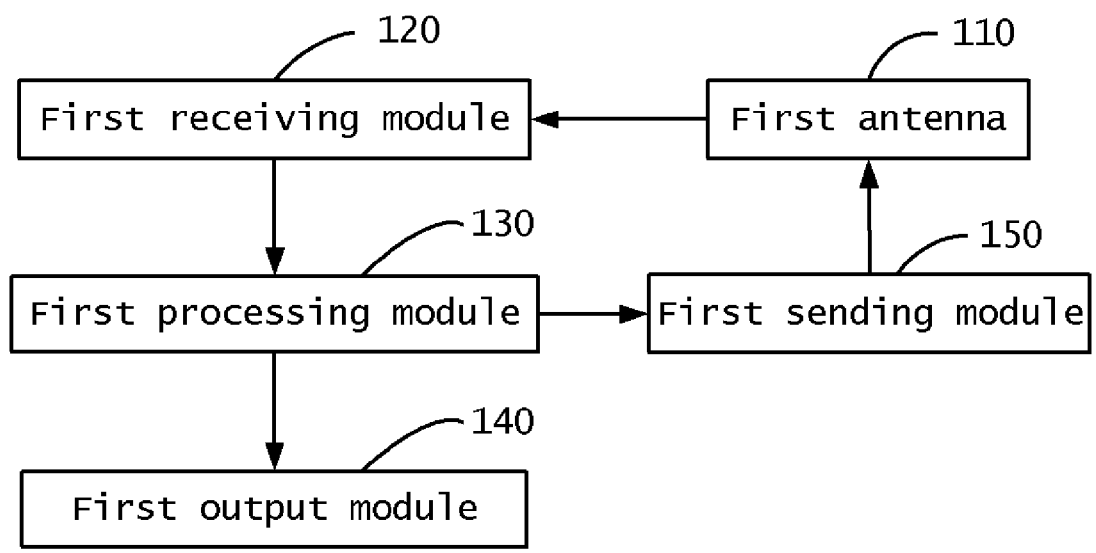
FIG. 2 is a schematic block diagram showing a first positioning device of FIG. 1.
Figure 3:
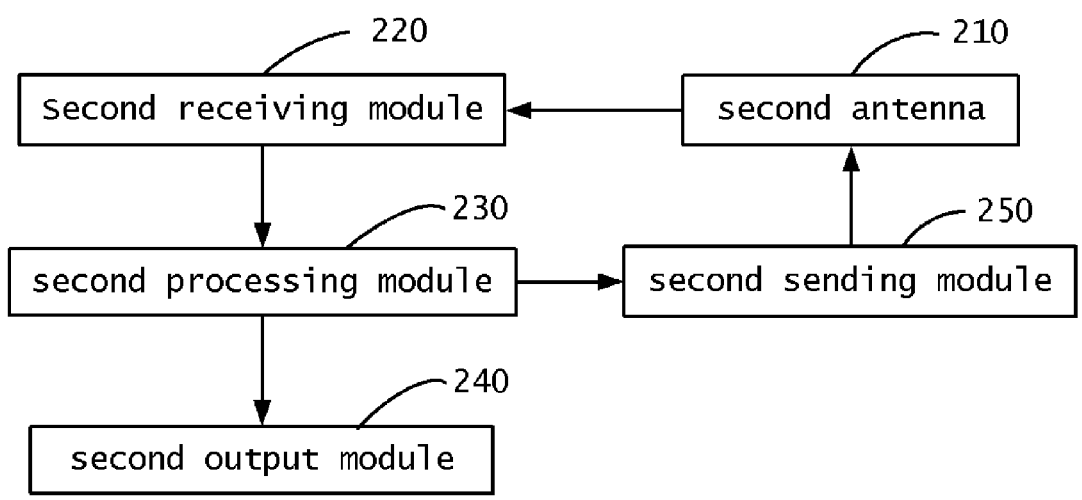
FIG. 3 is a schematic block diagram showing a second positioning device of FIG. 2.

Referring to FIGS. 2 and 3, the first positioning device 100 includes a first antenna 110, a first receiving module 120, a first processing module 130, a first output module 140, and a first sending module 150. The second positioning device 200 includes a second antenna 210, a second receiving module 220, a second processing module 230, a second output module 240, and a second sending module 250. The first positioning device 100 and the second positioning device 200 may be identical. For example, both positioning devices can have the structure of the first positioning device 100.

Using the first antenna 110, the first receiving module 120 receives positioning signals transmitted from the positioning satellites 300.

The first processing module 130 is electrically connected with the first receiving module 120 for determining a position of the first positioning device 100 according to the positioning signals received by the first receiving module 120.

The first output module 140 outputs the position of the first positioning device 100 in at least one format, e.g., data images and audible sounds. Therefore, the position of the first positioning device 100 can be known by the user. For example, the first output module 140 may be a display screen displaying the position of the first positioning device 100 on a map. The first output module 140 may also include a speaker for outputting spoken sounds corresponding to the position of the first positioning device 100.

The first sending module 150 is connected with the first processing module 130 and the first antenna 110 sends the position signal of the first positioning device 100 to the ground monitoring system 400 using the first antenna 110.

The ground monitoring system 400 is capable of communicating with multiple positioning devices 100, 200. The ground monitoring system 400 receives a signal corresponding to the position of the second positioning device 200 and transmits the signal to the first positioning device 100 using the positioning satellites 300.

The first receiving module 120, using the first antenna 110, receives the position signal corresponding to the second positioning device 200.

The first processing module 130 can also calculate a distance between the first positioning device 100 and the second positioning device 200 according to the position signals of the first positioning device 100 and the second positioning device 200.

The first output module 140 can also output the position of the second positioning device 200 and the distance between the first positioning device 100 and the second positioning device 200.

Figure 4:
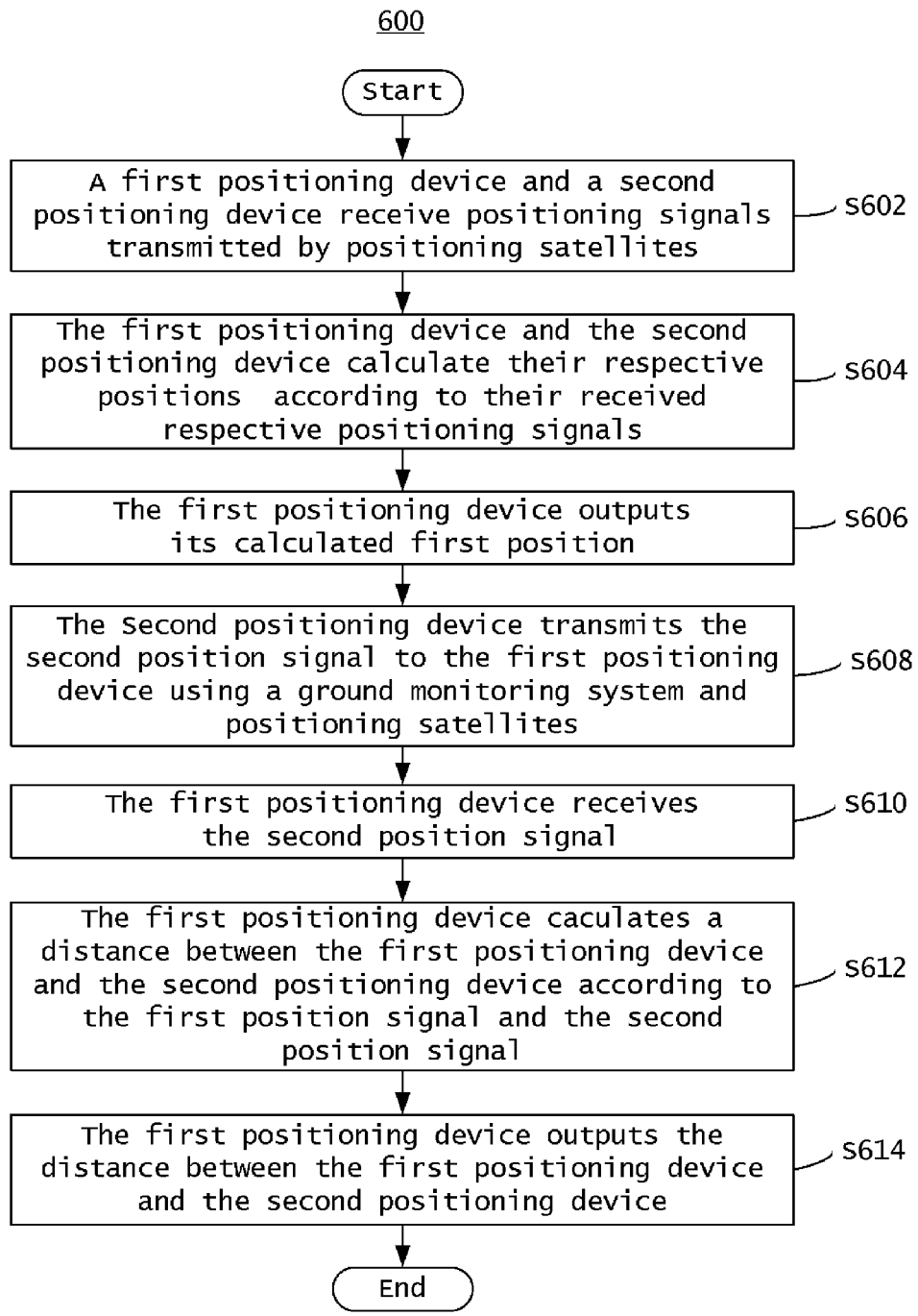
FIG. 4 is a flow chart illustrating a method for measuring distance between positioning devices in accordance with an exemplary embodiment.

Referring to FIG. 4, a procedure of a method 600 for measuring distance between positioning devices in accordance with an exemplary embodiment is illustrated. The method 600 may be implemented using the communication system 99 (FIG. 1). The various actions in the method 600 may be performed in the order presented, or may be performed in a different order. Furthermore, in some embodiments, some actions listed in FIG. 4 may be omitted from the method 600. The method 600 includes the following steps.

Beginning in step S602, a first positioning device 100 and a second positioning device 200 receive positioning signals transmitted by positioning satellites 300.

In step S604, the first positioning device 100 and the second positioning device 200 calculate their respective positions according to their received respective positioning signals.

In step S606, the first positioning device 100 outputs its calculated first position, so that the first position can be known.

In step S608, the second positioning device 200 transmits its second position signal to the first positioning device 100 using the ground monitoring system 400 and positioning satellites 300.

In step S610, the first positioning device 100 receives the second position signal.

At block S612, the first positioning device 100 calculates a distance between the first positioning device 100 and the second positioning device 200 according to the first position signal of the first positioning device 100 and the second position signal of the second positioning device 200.

In step S614, the first positioning device 100 outputs the second position of the second positioning device 200 and the distance between the first positioning device 100 and the second positioning device 200, not only the first position of the first positioning device 100 can be known, but the distance of the first positioning device 100 relative to the second positioning device 200 can be known also.

It is to be understood, however, even though numerous information and advantages of the present disclosure have been set forth in the foregoing description, together with details of the structure and function of the present disclosure, the present disclosure is illustrative only, and changes may be made in detail, especially in matters of shape, size, and arrangement of parts within the principles of the present disclosure to the full extent indicated by the broad general meaning of the terms in which the appended claims are expressed.

What is claimed is:

1. A positioning device comprising:
    a receiving module that uses an antenna for receiving positioning signals transmitted by positioning satellites and a position signal of another positioning device;
    a processing module for determining a position of the positioning device according to the positioning signals and calculating a distance between the positioning device and another positioning device according to the position signal of the position device and the position signal of another positioning device; and
    an output module for outputting the distance.

2. The positioning device according to claim 1, wherein the output module is also used for outputting the position of the positioning device.

3. The positioning device according to claim 2, further comprising:
    a sending module for sending the position signal of the positioning device to another positioning device using a ground monitoring system and positioning satellites.

4. The positioning device according to claim 1, wherein the output module outputs the position in at least the form of one of data images and audible sounds.

5. A method for measuring distance between positioning devices comprising:
    receiving positioning signals transmitted by positioning satellites;
    determining a position of a first positioning device using the received positioning signals;
    receiving a position signal of a second positioning device;
    calculating a distance between the first positioning device and the second positioning device using the first position signal and the second position signal; and
    outputting the distance between the first positioning device and the second positioning device.

6. The method according to claim 5, further comprising:
outputting the first position of the first positioning device.

7. The method according to claim 5, further comprising:
transmitting the second position signal of the second positioning device to the first positioning device using a ground monitoring system and the positioning satellites.

8. A mobile phone comprising:
    a receiving module that uses an antenna for receiving positioning signals transmitted by positioning satellites and a position signal of another mobile phone;
    a processing module for determining a position of the mobile phone according to the positioning signals and calculating a distance between the mobile phone and another mobile phone according to the position signal of the mobile phone and the position signal of another mobile phone; and
    an output module for outputting the distance.

9. The mobile phone according to claim 8, wherein the output module is also used for outputting the position of the mobile phone.

10. The mobile phone according to claim 9, further comprising:
    a sending module for sending the position signal of the mobile phone to another mobile phone using a ground monitoring system and positioning satellites.

11. The mobile phone according to claim 8, wherein the output module outputs the position in at least the form of one of data images and audible sounds.

* * * * *